(12) United States Patent
Azad-Tatari (10) Patent No.: US 11,352,042 B2
(45) Date of Patent: Jun. 7, 2022

(54) DETACHABLE BRACE FOR COLLAPSIBLE STROLLER

(71) Applicant: Sarah G. Azad-Tatari, Los Angeles, CA (US)

(72) Inventor: Sarah G. Azad-Tatari, Los Angeles, CA (US)

( * ) Notice: Subject to any disclaimer, the term of this patent is extended or adjusted under 35 U.S.C. 154(b) by 0 days.

(21) Appl. No.: 16/521,578

(22) Filed: Jul. 24, 2019

(65) Prior Publication Data
US 2020/0031381 A1    Jan. 30, 2020

Related U.S. Application Data (60) Provisional application No. 62/702,361, filed on Jul. 24, 2018.

(51) Int. Cl.
*B62B 9/20* (2006.01)
*B62B 7/06* (2006.01)

(52) U.S. Cl.
CPC .................. *B62B 9/20* (2013.01); *B62B 7/06* (2013.01); *B62B 2205/00* (2013.01)

(58) Field of Classification Search
CPC ............ B62B 9/20; B62B 9/203; B62B 9/206
USPC ......... 280/647, 650, 657, 658, 47.38, 47.39, 280/47.4, 47.41, 655, 655.1
See application file for complete search history.

(56) References Cited

U.S. PATENT DOCUMENTS

| | | | | |
|---|---|---|---|---|
| 5,464,183 A | * | 11/1995 | McConnell | B62B 9/26 248/311.2 |
| 5,645,204 A | * | 7/1997 | Struzer | B60R 11/00 224/547 |
| 5,918,892 A | * | 7/1999 | Aaron | F16B 7/0433 280/47.38 |
| D523,789 S | * | 6/2006 | Caselberry | D12/133 |
| D783,464 S | * | 4/2017 | Menn | D12/133 |
| 10,654,507 B2 | * | 5/2020 | Perilli | B62B 9/20 |
| 2005/0246861 A1 | * | 11/2005 | Monrad | B62B 9/20 16/110.1 |
| 2008/0143067 A1 | * | 6/2008 | Wicka | B62B 5/068 280/47.11 |
| 2009/0278335 A1 | * | 11/2009 | Dotsey | B62B 7/10 280/647 |
| 2016/0059877 A1 | * | 3/2016 | Shah | B62B 9/20 16/421 |
| 2021/0024113 A1 | * | 1/2021 | Bar-Or | B62B 5/0016 |

* cited by examiner

*Primary Examiner* — Joshua T Kennedy
(74) *Attorney, Agent, or Firm* — Thrasher Associates (57) ABSTRACT

A detachable bracing bar for a collapsible stroller that has a rigid bracing bar, a first end cap coupled to a first end of the bracing bar and a second end cap coupled to a second end of the bracing bar, a first strap coupled to the first end cap, and a second strap removably coupled to the second end cap where the first strap and the second strap are adapted to removably couple to a first handlebar and a second handle bar of a collapsible stroller in a position that enables a user to grasp the rigid bracing bar and push the collapsible stroller with one hand.

15 Claims, 6 Drawing Sheets

(Prior Art)

DETACHABLE BRACE FOR COLLAPSIBLE STROLLER

CLAIM OF PRIORITY

The invention is related to and claims priority from U.S. Provisional Patent Application No. 62/702,361 to Sarah G. Azad-Tatari filed on 24 Jul. 2018, and entitled UMBRELLA STROLLER BAR.

TECHNICAL FIELD

The invention generally relates to strollers for infants and toddlers, and in particular to strollers that collapse, also known as umbrella strollers.

Problem Statement and History

Interpretation Considerations

This section describes technical field in detail and discusses problems encountered in the technical field. Therefore, statements in the section are not to be construed as prior art.

Discussion of History of the Problem

Traditional lightweight, collapsible (aka "umbrella-style") baby/infant/toddler/juvenile strollers fold in a manner similar to an umbrella—hence the name "umbrella stroller." Because of this folding action, the handlebars (one left and right side) must be separated so the stroller can hinge in the center and fold up tightly. This folding aspect of the stroller structure, although providing for easier storage, is at the same time the primary cause of the problem.

Specifically, collapsible strollers with two handlebars require two available hands to easily push the stroller in a straight line. Because few people have both hands free to push a stroller, the person pushing the stroller often struggles to push the stroller in a straight (or otherwise predictable) path on a sidewalk. Additionally, when using only one hand, swerving to avoid sidewalk mishaps is nearly impossible and can cause even more tragic injury to the child being transported.

Further, a person who tends to carry something in one arm—such as a cellular phone, coffee cup, book, or another child, for example—while pushing the stroller is frustrated as they try to keep the stroller on a predicable and stable path. Even worse, sometimes the stroller will begin to spontaneously collapse, risking injury to the child, the parent or other person pushing the stroller, or even passers-by.

Accordingly, there is a need for to adapt a stroller to be pushed with one hand, and/or a way to reinforce the structural integrity of the stroller. The present invention enables a person to push these strollers with just one hand, and simultaneously reinforces the structural integrity of the stroller, thereby providing a solution to these problems.

SUMMARY

The invention provides a one-piece bracing bar that removably couples between the two handlebars of a collapsible stroller. Preferably, the bracing bar couples to each handlebar using a hook-and-look (also known as Velcro®) strap to connect to each handlebar of a dual-handled collapsible stroller (simply "stroller"), which creates one solid connecting cross-bar for easy single handed control while the stroller is pushed. The bracing bar disconnects from one of the handlebars quickly with a locking-button mechanism, thereby converting the dual-handled stroller into a single-handed stroller.

BRIEF DESCRIPTION OF THE DRAWINGS

Various aspects of the invention and its embodiment are better understood by referring to the following detailed description. To understand the invention, the detailed description should be read in conjunction with the drawings, in which.

DESCRIPTION OF AN EXEMPLARY PREFERRED EMBODIMENT

Interpretation Considerations

While reading this section (An Exemplary Embodiment, which describes the exemplary embodiment of the best mode of the invention, hereinafter referred to as "exemplary embodiment"), one should consider the exemplary embodiment as the best mode for practicing the invention during filing of the patent in accordance with the inventor's belief. As a person with ordinary skills in the art may recognize substantially equivalent structures or substantially equivalent acts to achieve the same results in the same manner, or in a dissimilar manner, the exemplary embodiment should not be interpreted as limiting the invention to one embodiment.

The discussion of a species (or a specific item) invokes the genus (the class of items) to which the species belongs as well as related species in that genus. Similarly, the recitation of a genus invokes the species known in the art. Furthermore, as technology develops, numerous additional alternatives to achieve an aspect of the invention may arise. Such advances are incorporated within their respective genus and should be recognized as being functionally equivalent or structurally equivalent to the aspect shown or described.

A function or an act should be interpreted as incorporating all modes of performing the function or act, unless otherwise explicitly stated. For instance, a removable coupling may be achieved via the buckle mechanism shown and described, or through alternative buckle mechanisms such as seatbelt buckles or airplane seat buckles, or even dissimilar means, such as a removable hook-and-loop strap, for example. Accordingly, the use of the word "coupling" invokes all modes of the word and similar words such as "removably attached."

Unless explicitly stated otherwise, conjunctive words (such as "or", "and", "including", or "comprising") should be interpreted in the inclusive and not the exclusive sense.

As will be understood by those of the ordinary skill in the art, various structures and devices are depicted in the block diagram to not obscure the invention. In the following discussion, acts with similar names are performed in similar manners, unless otherwise stated.

The foregoing discussions and definitions are provided for clarification purposes and are not limiting. Words and phrases are to be accorded their ordinary, plain meaning, unless indicated otherwise.

DESCRIPTION OF THE DRAWINGS, A PREFERRED EMBODIMENT

In one embodiment the invention is a product that is a universal collapsible stroller bracing bar that quickly converts any two-handled baby stroller/pram into a one-handed driving stroller. The one-piece bracing bar attaches using hook-and-loop (also known as a "Velcro®") straps to connect to each handle bar of a two-handled stroller to create a single, effectively-solid cross-bar for easy single-handed guidance/steering. The bracing bar locks and unlocks across a collapsible stroller with a sliding lock-mechanism, which includes the buckling mechanism shown, so that users do not need to remove the hook-and-loop straps after the bar has been assembled onto a stroller (removing the straps from handlebars can quickly degrade the strength of the hook-and-loop adhesion).

Figure 1:
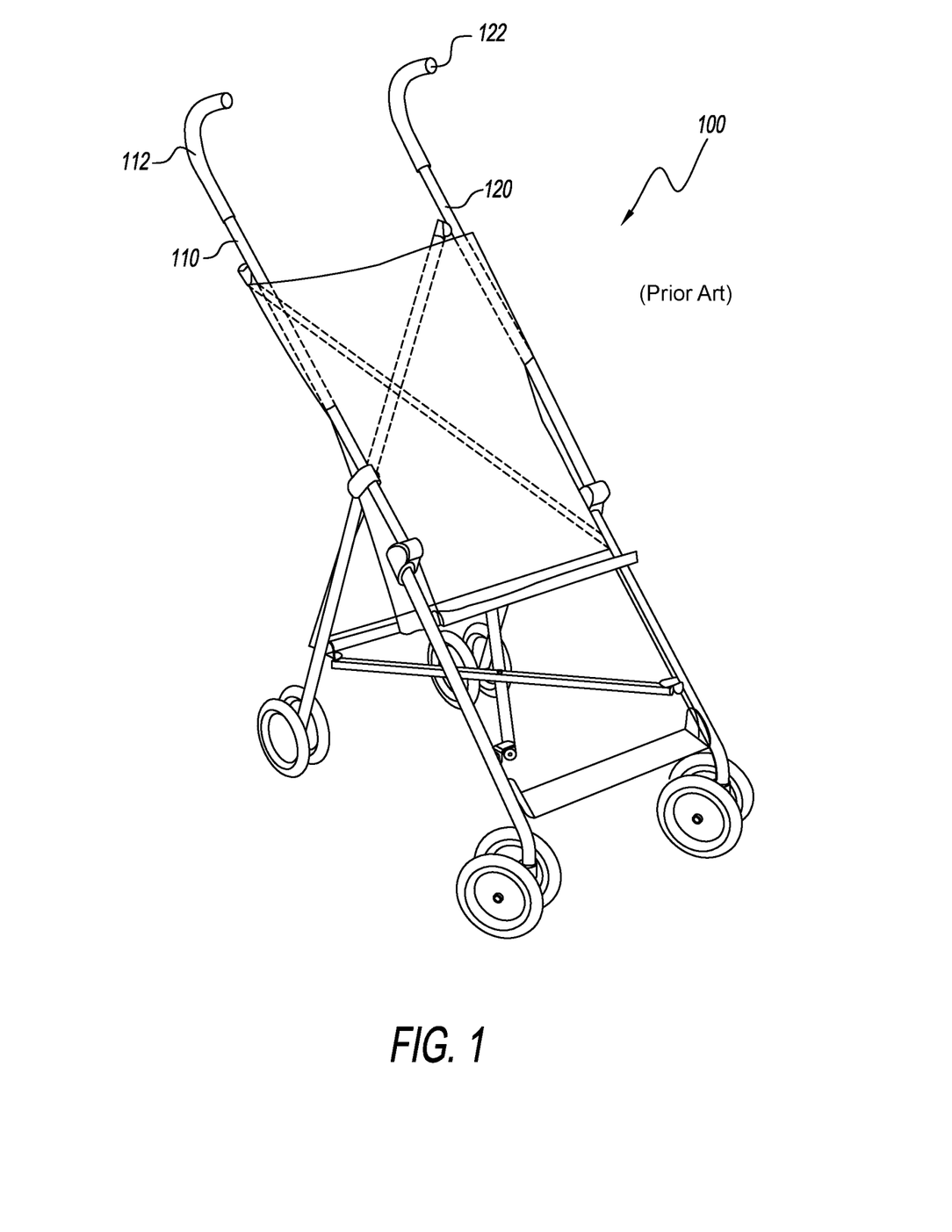
FIG. 1 (Prior Art) illustrates a collapsible stroller.

FIG. 1 (Prior Art) illustrates a collapsible stroller ("the stroller") 100 of the type used for a toddler. The relevant parts of the stroller 100 for the present discussion are the first handlebar 110 having a first grip 112, and the second handlebar 120 having a second grip 122, that together form part of the frame of the collapsible stroller 100. Such devices are widely available in a variety of embodiments, and date back to approximately the 1970s when Henry Fleischer received U.S. Pat. No. 4,256,325.

Figure 2A:
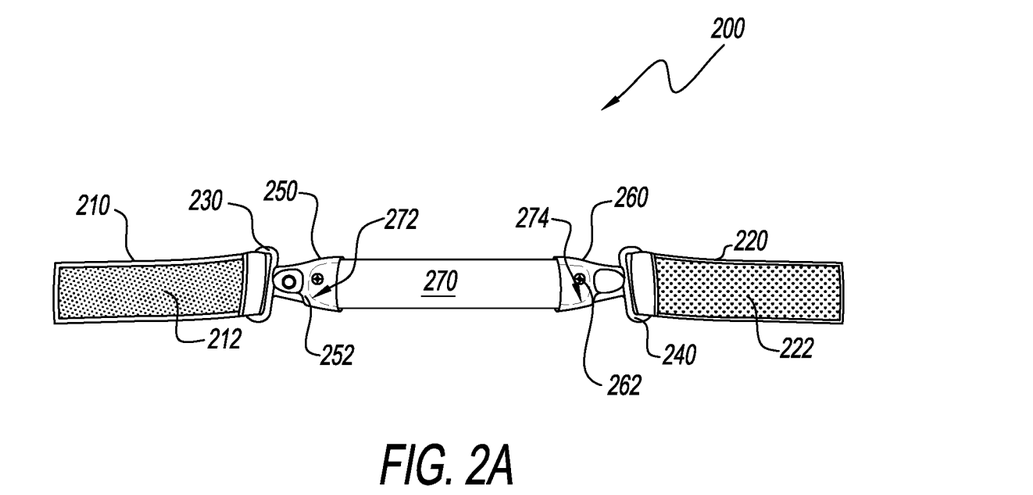
FIG. 2A illustrates the inventive detachable bracing bar.

FIG. 2 illustrates the detachable bracing bar 200. The bracing bar 200 has a first strap 210 and a second strap 220, a first strap hardware 230 and a second strap hardware 240, a first hinged end cap ("hinged end cap") 250 and a second buckling end cap ("buckling end cap") 260, and a brace bar 270. The first strap 210 couples to the first strap hardware 230 by passing through an elongated eye in the first strap hardware 230 and then being coupled to itself via stitching, adhesive, or rivets, for example. The second strap 220 likewise couples to the second strap hardware 250. The coupling portions of the straps 210, 220 have hook-and-loop material thereon. Typically, firmer 'hook' material 222 covers one side of each strap, and fuzzy 'loop' material 212 covers the other side of each strap.

Figure 2B:
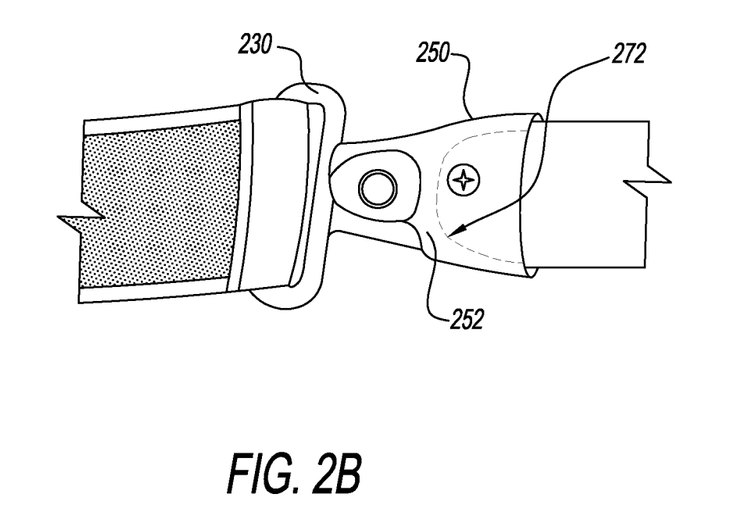
FIG. 2B is a close-up view of the hinged coupling of the first strap hardware and the hinged end cap of FIG. 2A.

The coupling of the first strap hardware 230 to the hinged end cap 250 is show in more detail in FIG. 2B; accordingly, FIG. 2B is a close-up view of the hinged coupling of the first strap hardware and the hinged end cap of FIG. 2A. Here, it is seen that the hinged end cap 250 has a generally open portion that allows the first strap hardware 230 to pivot 90-degrees about a rivet 254 which functions as the hinge. When installed, the user attached the first strap 210 to the first handle bar 110 such that the hinged end cap is positioned to allow the bracing bar 270 to 'fall' when it is detached at the buckling end cap 260—that is to say that it rotatably pivots 90 degrees into a 'down' position such that a user can collapse the collapsible stroller 100.

The coupling of the second strap hardware 240 to the buckling end cap 260 is discussed in more detail below.

The bracing bar 270 is preferably a rigid, cylindrical, foam-covered composite, metal, or plastic bar having a first end 272 and a second end 274. The brace bar 270 is preferably slides into and is secured to an inside portion of the end caps 250, 260 via a first screw 252 and a second screw 262, or other securing means such as glue, adhesive, or threading, for example. The brace bar 270, the end caps 250, 260, and the strap hardware 230, 240 are together approximately two to four inches shorter than the distance separating the first handlebar 110 and the second handlebar 120 of FIG. 1.

Figure 3:
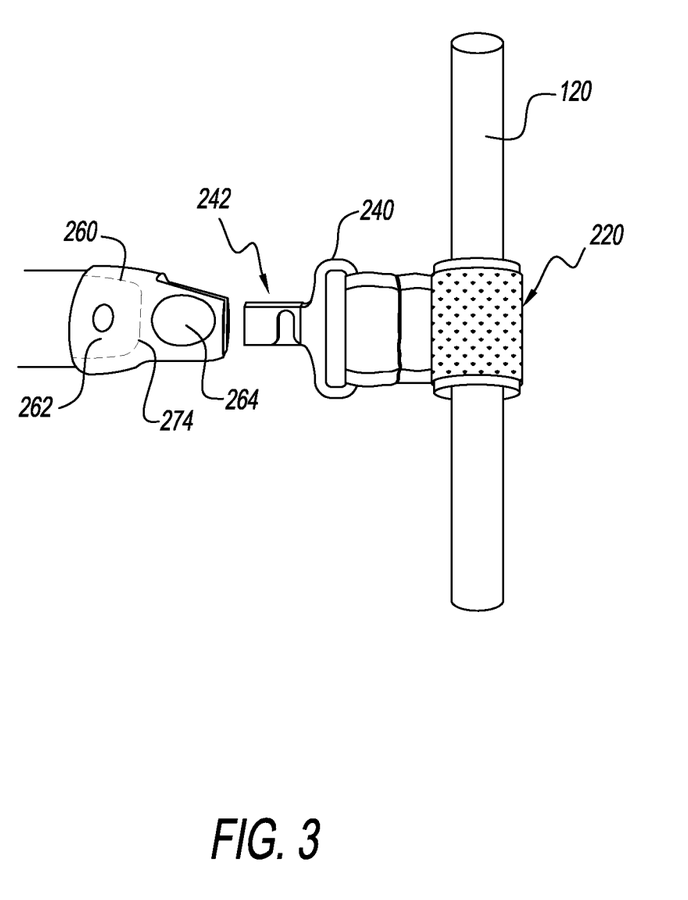
FIG. 3 illustrates a close-up of the bracing bar with the detachable portion coupled to a handlebar via a hook-and-loop strap.

FIG. 3 illustrates a close-up of the second strap 220 coupled to the second handle bar 120 via the hook-and-loop coupling. Here, the buckling end cap 260 is detached from the second strap hardware 240 to illustrate that the second strap hardware 240 has a notch (or tongue) 242 that couples to the buckling end cap 260 as described in more detail below.

Figure 4:
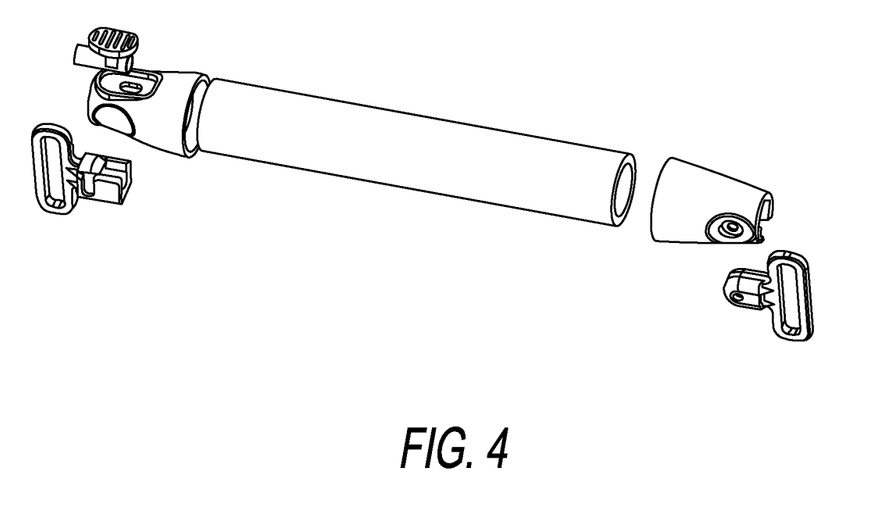
FIG. 4 is an exploded view of the bracing bar.

FIG. 4 is an exploded view of the detachable bracing bar 200 at the buckling end cap 260 and second strap hardware 240. In FIG. 4 it is seen that the buckling end cap 260 has an articulable thumb knob 266 that likewise has an integrated dowel 267 extending perpendicularly to the planar surface of the knob 266. The dowel 267, when coupled to the buckling end cap 260 via an elongated hole 265 in the buckling end cap 260, extends far enough to couple with a spring-articulated piston 268, which fits snugly, but not tightly, against a spring 269 that rests in a cavity 261 formed in the buckling end cap 260. The cavity 261 terminates (ends) at a terminus 263 in the buckling end cap 260. Together, the thumb knob 266, dowel 267, piston 268 and spring 269 define a locking assembly 280, and are held together by a screw 282. These items are described in more detail in FIGS. 5A-5C below.

The latch 242 has an interior cavity for accepting the stroke of the piston 268 when in a locked position. Additionally, the latch 242 interior is substantially closed (or 'solid') on its base and three side surfaces, accommodates the piston 268 at one 'surface' and is open on one side 'surface' to accommodate the motion of the thumb knob 266.

Figure 5A:
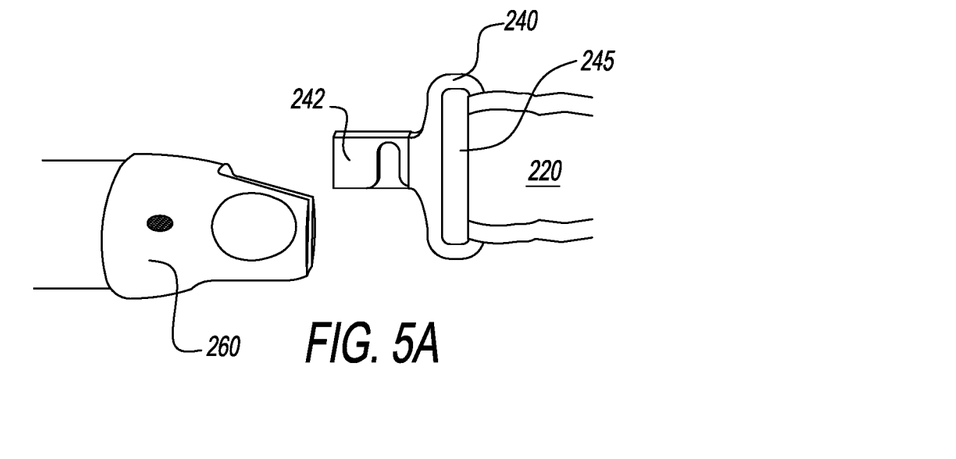
FIG. 5A shows a close up of the bracing bar buckle mechanism, facing a bracing bar buckle end cap indention.

FIG. 5A shows a close up of the detachable bracing bar's 200 buckle mechanism positioned such that the latch 242 and the buckling end cap 262 are oriented to interconnect. From FIG. 5A it is seen that the latch 242 comprises a first channel 246 and a second channel (not shown in FIG. 5A, but existing opposite the first channel 246) proximate to the elongated eye of the second strap hardware 240. The channels 246 are closed at the end that terminates proximate the exterior side of the latch 242, where the exterior side of the latch 242 is defined as the only side of the latch 242 that forms an exterior portion of the removable bracing bar 200. Further, the channels 246 are preferably beveled-open at their other end, opposite the exterior side of the latch 242, to make it easier for the channels 246 to slide over channel guides (discussed below).

Figure 5B:
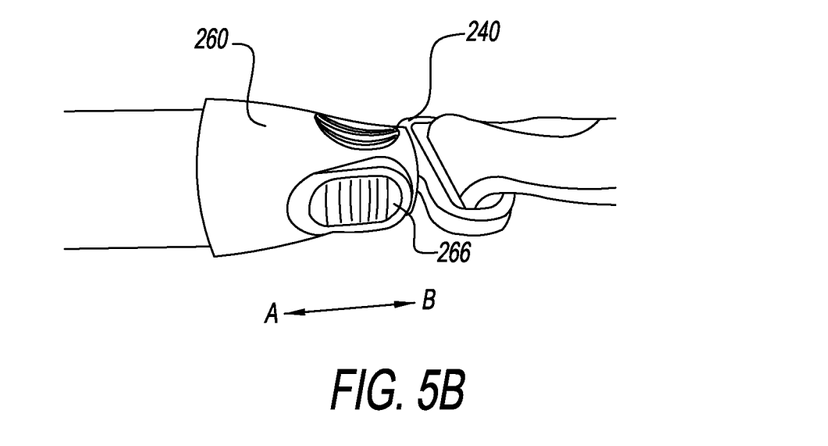
FIG. 5B shows a close up of the bracing bar buckle mechanism in a locked position, facing the bracing bar thumb knob.

FIG. 5B shows a close up of the detachable bracing bar's 200 buckle mechanism in a locked position, facing the articulable thumb knob 266. The arrow with two ends illustrates that the thumb knob 266 may be articulated; however, because the piston 268 is spring-loaded, it is more proper to say that the thumb knob 266 is articulated down to an unlock position A by a user, and is then pushed to a locked position B by the spring 269. Although position B is described as locked, when the latch 242 is not already in the buckling end cap 260 the piston 268 blocks the channels 246 from accepting the channel guides, and the latch 242 cannot then be inserted into the bucking end cap 260 unless the thumb knob 266 is in the unlocked position A. Referring again to FIG. 4, the thumb knob's 266 dowel.

Figure 5C:
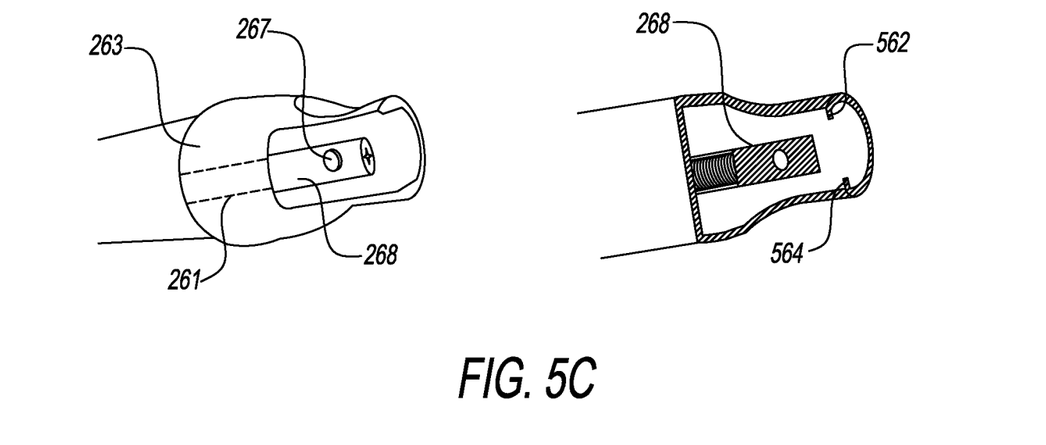
FIG. 5C shows a close up of the interior portion of the assembled buckling end cap.

FIG. 5C shows a close up of the interior portion of the assembled buckling end cap 260. The buckling end cap's interior portion houses the spring-loaded piston 268. Here, one can see the end of the dowel 267 protruding slightly though the piston 268. Further, a first channel guide 562 and a second channel guide 564 and their orientation near the end of the buckling end cap 260 are seen.

The hinged end cap 250 comprises an opening similar to that of the buckling end cap 260. However, rather than a cavity for accepting a piston, the hinged end cap 250 has a rivet 254 that couples to a hole (not shown) in the first strap hardware 230, such that the first strap hardware 230 freely pivots 90-degrees in a single degree of freedom in the interior portion of the hinged end cap 250.

Figure 6:
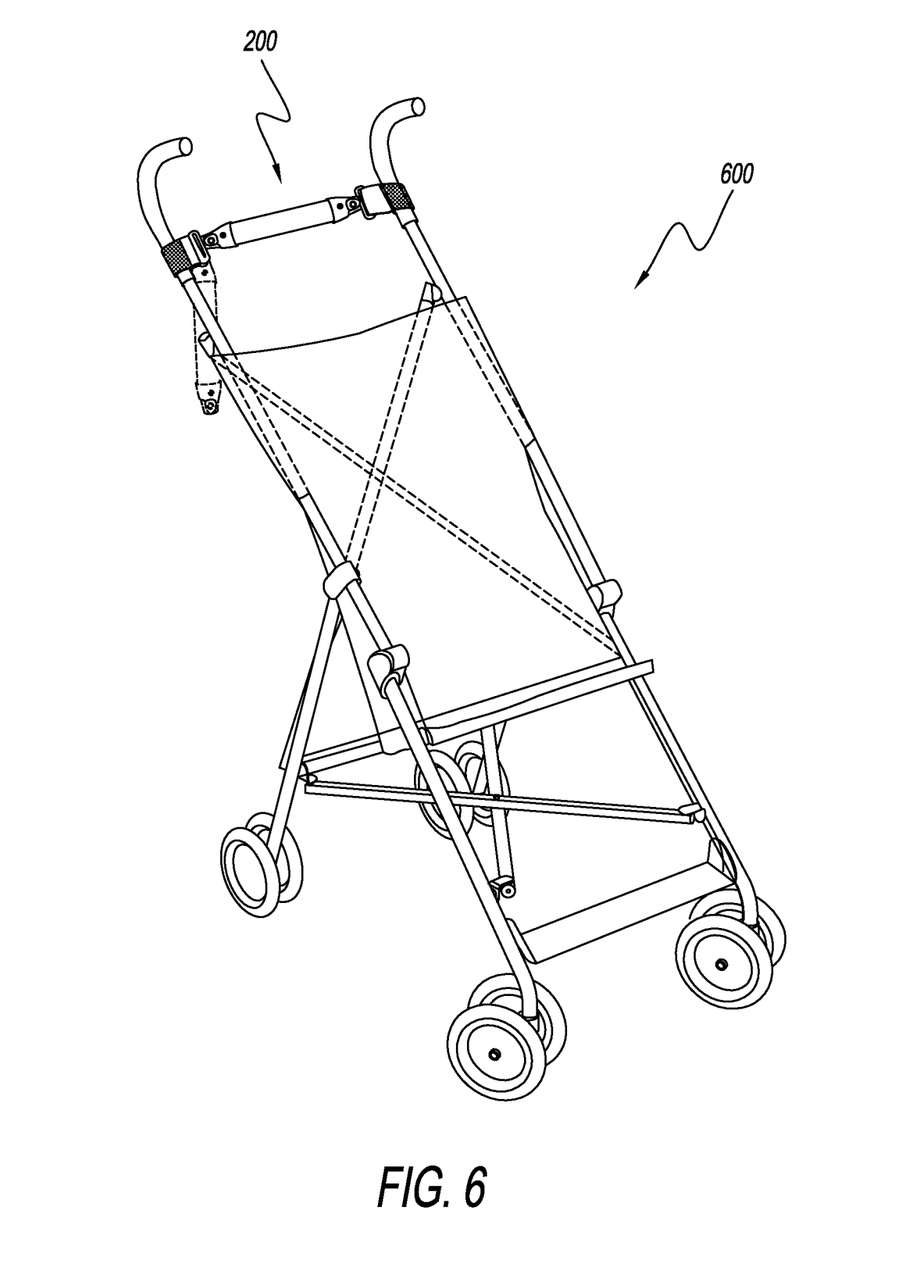
FIG. 6 illustrates the removable bracing coupled to securely brace the collapsible stroller of FIG. 1.

FIG. 6 illustrates the removable bracing bar 200 coupled to securely brace the collapsible stroller 100 of FIG. 1. The dashed lines illustrate one possible position for the removable bracing bar 200 when the buckling end cap 260 is separated from the latch 242.

The removable bracing bar 200 connects to handlebars 110, 120 of the stroller 100 using the two easily adjustable hook-and-loop straps 210, 220 to ensure a snug and secure fit that will not go slack or move. The hook-and-loop straps 210, 220 do not need to be removed from the bars 110, 120 and thus allow the removable bracing bar 200 to stay on the stroller 100 as a permanent accessory/tool. The removable bracing bar 200 easily connects and locks to provide a brace and handle combination. The spring-loaded piton 268 prevents the buckling mechanism from unintentionally being released, allowing the stroller 100 to collapse. The bar's orientation is also easily reversed to accommodate right-handed or left-handed users. Once a user wants to collapse the stroller 600, the user un-locks the locking assembly by articulating the thumb knob to the unlock position A and then sliding the latch 242 out of the buckling end cap 260, allowing the two major portions of the detachable bracing bar 200 to move out of the way so the user may easily fold the stroller 100 for storage or travel.

Although the invention has been described and illustrated with specific illustrative embodiments, it is not intended that the invention be limited to those illustrative embodiments. Those skilled in the art will recognize that variations and modifications can be made without departing from the spirit of the invention. Therefore, it is intended to include within the invention, all such variations and departures that fall within the scope of the appended claims and equivalents thereof.

I claim:

1. A detachable bracing bar for a collapsible stroller, comprising:
    a rigid bracing bar having a first end and a second end;
    a first end cap coupled to the first end of the bracing bar and a second end cap coupled to the second end of the bracing bar;
    a first strap coupled to the first end cap, and a second strap removably coupled to the second end cap;
    the first strap and the second strap are adapted to removably couple to a first handlebar and a second handle bar of a collapsible stroller in a position that enables a user to grasp the rigid bracing bar and push the collapsible stroller with one hand; the first strap hardware comprises an elongated eye portion and a hole, the first strap hardware is pivotably secured to the first end cap at the hole via a pivot means and the elongated eye secures the first strap hardware to the first strap, and the second strap hardware comprises an elongated eye portion and a latch, the second elongated eye secures the first strap hardware to the first strap and the latch removably secures the second strap hardware to the second end cap.

2. The detachable bracing bar of claim 1 wherein the second end cap comprises a buckle that is adapted to removably secure the latch.

3. The detachable bracing bar of claim 2 wherein the buckle comprises:
    a cavity in the second end cap for accepting a spring, and an articulating piston, the spring coupled between the piston and the terminus of the cavity,
    the second end cap having an interior portion adapted to accept the mating of the latch; and
    the interior portion comprising at least a first channel guide adapted to guide coupling the latch with the second end cap via a first channel in the latch; and
    the latch comprises a cavity for accepting the articulating piston, the piston coupled to an articulating knob via a dowel that extends through an elongated hole in the second end cap.

4. A detachable bracing bar for a collapsible stroller, comprising:
    a rigid cylindrical bracing bar having a first end and a second end;
    the first end of the bracing bar is insertably coupled and secured into a first end cap, and the second end of the bracing bar is insertably coupled and secured into a second end cap;
    a first strap and a second strap;
    a first strap hardware coupled between the first strap and the first end cap and a second strap hardware coupled between the second strap and the second strap hardware;
    the first strap and the second strap are adapted to removably couple to a first handlebar and a second handle bar of a collapsible stroller in a position that enables a user to grasp the rigid bracing bar and push the collapsible stroller with one hand by
    the first strap comprising a hook-and-loop attachment via hook-and-loop hook covering a surface of the first strap, and a hook-and-loop loop covering an alternative surface of the first strap, and
    the second strap comprises a hook-and-loop attachment via hook-and-loop hook coving a surface of the second strap, and a hook-and-loop loop covering an alternative surface of the second strap;
    the second strap hardware comprises an elongated eye portion and a latch, the second elongated eye secures the first strap hardware to the first strap and the latch removably secures the second strap hardware to the second end cap via a buckle that is adapted to removably secure the latch.

5. The detachable bracing bar of claim 4 wherein the buckle is a seatbelt buckle selected from the group of: car seat belt buckles, and airplane seat belt buckles.

6. The detachable bracing bar of claim 4 wherein the buckle is a hook-and-loop strap.

7. The detachable bracing bar of claim 4 wherein the first strap hardware comprises an elongated eye portion and a hole, the first strap hardware is pivotably secured to the first end cap at the hole via a pivot means and the elongated eye secures the first strap hardware to the first strap.

8. The detachable bracing bar of claim 7 wherein the latch comprises a first channel and a second channel, the first channel and second channel being located on opposite sides of the latch, have a curve-beveled first channel opening and a curve-beveled second channel opening, and terminate proximate to an exterior surface of the latch.

9. The detachable bracing bar of claim 8 wherein the buckle comprises:
- a cavity in the second end cap for accepting a spring, and an articulating piston, the spring coupled between the piston and the terminus of the cavity,
- the second end cap having an interior portion adapted to accept the mating of the latch; and
- the interior portion comprising at least a first channel guide adapted to guide coupling the latch with the second end cap via a first channel in the latch; and
- the latch comprises a cavity for accepting the articulating piston, the piston coupled to an articulating knob via a dowel that extends through an elongated hole in the second end cap.

10. A collapsible stroller secured with a detachable bracing bar, comprising:
- a rigid bracing bar having a first end and a second end;
- a first end cap coupled to the first end of the bracing bar and a second end cap coupled to the second end of the bracing bar;
- a first strap and a second strap;
- a first strap hardware coupled between the first strap and the first end cap and a second strap hardware coupled between the second strap and the second strap hardware;
- a collapsible stroller having a first handlebar and a second handlebar;
- the first strap and the second strap are adapted to removably couple to the first handlebar and the second handle bar of the collapsible stroller in a position that enables a user to grasp the rigid bracing bar and push the collapsible stroller with one hand by
  - the first strap comprising a hook-and-loop attachment via hook-and-loop hook covering a surface of the first strap, and a hook-and-loop loop covering an alternative surface of the first strap, and
  - the second strap comprises a hook-and-loop attachment via hook-and-loop hook coving a surface of the second strap, and a hook-and-loop loop covering an alternative surface of the second strap;
- the second strap hardware comprises an elongated eye portion and a latch, the second elongated eye secures the first strap hardware to the first strap and the latch removably secures the second strap hardware to the second end cap via a buckle that is adapted to removably secure the latch.

11. The detachable bracing bar of claim 10 wherein the buckle is a seatbelt buckle selected from the group of: car seat belt buckles, and airplane seat belt buckles.

12. The detachable bracing bar of claim 10 wherein the buckle is a hook-and-loop strap.

13. The detachable bracing bar of claim 10 wherein the first strap hardware comprises an elongated eye portion and a hole, the first strap hardware is pivotably secured to the first end cap at the hole via a rivet, and the elongated eye secures the first strap hardware to the first strap, and the second strap hardware comprises an elongated eye portion and a latch, the second elongated eye secures the first strap hardware to the first strap and the latch removably secures the second strap hardware to the second end cap.

14. The detachable bracing bar of claim 13 wherein the latch comprises a first channel and a second channel, the first channel and second channel being located on opposite sides of the latch, have a curve-beveled first channel opening and a curve-beveled second channel opening, and terminate proximate to an exterior surface of the latch.

15. The detachable bracing bar of claim 14 wherein the buckle comprises:
- a cavity in the second end cap for accepting a spring, and an articulating piston, the spring coupled between the piston and the terminus of the cavity,
- the second end cap having an interior portion adapted to accept the mating of the latch;
- the interior portion comprising a first channel guide adapted to guide coupling the latch with the second end cap via the first channel in the latch, and a second channel guide adapted to guide coupling the latch with the second end cap via the second channel in the latch;
- the latch comprises a cavity for accepting the articulating piston, the piston coupled to an articulating knob via a dowel that extends through an elongated hole in the second end cap; and
- the latch being coupled into the second end cap.

* * * * *